United States Patent
Lai et al.

(10) Patent No.: US 11,127,301 B1
(45) Date of Patent: Sep. 21, 2021

(54) SYSTEMS AND METHODS FOR ADAPTING OPERATION OF AN ASSISTANCE SYSTEM ACCORDING TO THE PRESENCE OF A TRAILER

(71) Applicant: DENSO CORPORATION, Kariya (JP)

(72) Inventors: Ting-Yu Lai, Ann Arbor, MI (US); Ryo Takaki, Southfield, MI (US); Bo Sun, Farmington Hills, MI (US)

(73) Assignee: DENSO CORPORATION, Kariya (JP)

( * ) Notice: Subject to any disclaimer, the term of this patent is extended or adjusted under 35 U.S.C. 154(b) by 10 days.

(21) Appl. No.: 16/814,542

(22) Filed: Mar. 10, 2020

(51) Int. Cl.
*G08G 1/16* (2006.01)
*B60R 1/02* (2006.01)

(52) U.S. Cl.
CPC .............. *G08G 1/167* (2013.01); *B60R 1/025* (2013.01); *B60R 2300/802* (2013.01)

(58) Field of Classification Search
CPC .... G08G 1/167; B60R 1/025; B60R 2300/802
See application file for complete search history.

(56) References Cited

U.S. PATENT DOCUMENTS

| | | | |
|---|---|---|---|
| 7,218,757 B2 | 5/2007 | Franz | |
| 8,798,841 B1 | 8/2014 | Nickolaou | |
| 9,129,528 B2 * | 9/2015 | Lavoie | G08G 1/0962 |
| 9,811,091 B2 | 11/2017 | Dolgov et al. | |
| 9,821,845 B2 | 11/2017 | Xu et al. | |
| 9,937,861 B2 | 4/2018 | Shehan et al. | |
| 10,286,916 B2 | 5/2019 | Prasad et al. | |
| 10,328,949 B2 | 6/2019 | Kamata | |
| 2006/0152351 A1 * | 7/2006 | Daura Luna | B60Q 9/005 340/435 |
| 2009/0125182 A1 | 5/2009 | Hoetzer et al. | |
| 2012/0050093 A1 | 3/2012 | Heilmann | |
| 2017/0299707 A1 | 10/2017 | Nguyen | |
| 2018/0105172 A1 | 4/2018 | Gesch et al. | |
| 2018/0197417 A1 | 7/2018 | Burtch et al. | |
| 2018/0273034 A1 | 9/2018 | Gesch et al. | |
| 2018/0356214 A1 | 12/2018 | Kozak et al. | |
| 2019/0210418 A1 | 7/2019 | Hall et al. | |

FOREIGN PATENT DOCUMENTS

WO 2019050448 A1 3/2019

OTHER PUBLICATIONS

Nikolic, "Embedded Vision in Advanced Driver Assistance Systems", Advances in Embedded Computer Vision, Springer International Publishing, ISBN: 9783319093871 (2014).

* cited by examiner

*Primary Examiner* — Nader Bolourchi
(74) *Attorney, Agent, or Firm* — Christopher G. Darrow; Darrow Mustafa PC

(57) ABSTRACT

System, methods, and other embodiments described herein relate to adapting operation of an assistance system in a subject vehicle according to a presence of a trailer. In one embodiment, a method includes, in response to determining that the trailer causes an occlusion to perception of at least one sensor about a surrounding environment of the subject vehicle, modifying system parameters associated with the assistance system according to the occlusion to adapt how the assistance system operates while the occlusion is present. The method includes controlling the assistance system as a function of the system parameters to improve assistance provided to an occupant of the subject vehicle.

20 Claims, 6 Drawing Sheets

| Function | Normal Behavior | Special Behavior |
|---|---|---|
| SEA | E-latch and buzzer | Only buzzer |
| SEA | TTC timing threshold = maximum 5s | TTC timing threshold = maximum 3s |
| LCA | TTC timing threshold = maximum 5s | TTC timing threshold = maximum 3s |
| BSM | Use radar only | Activate other sensor(s) or system(s) |

FIG. 6

SYSTEMS AND METHODS FOR ADAPTING OPERATION OF AN ASSISTANCE SYSTEM ACCORDING TO THE PRESENCE OF A TRAILER

TECHNICAL FIELD

The subject matter described herein relates in general to systems and methods for adapting the operation of a driving assistance system within a vehicle and, more particularly, to detecting the presence of a trailer attached to the vehicle and adapting behaviors of the driving assistance system according to the presence of the trailer.

BACKGROUND

Vehicles may employ various systems to assist in controlling the vehicle and protecting occupants, such as advanced driving-assistance systems (ADAS), and/or other assistive/warning systems (e.g., safe exit alert). These systems improve the safety of the occupants by providing alerts about hazardous circumstances and/or intervening in control of the vehicle. Such systems generally rely on perceptions of sensors to monitor for various conditions (e.g., the presence of an object in a blind spot) for which a system may generate an alert, generate a vehicle control input, or perform some other function.

However, when a field-of-view of the sensor is occluded due to, for example, the presence of a trailer, then the operation of the noted systems may be frustrated. That is, because the assistance system uses the sensor to monitor for the hazards, an occlusion may prevent the system from monitoring relevant areas, such as defined activation zones, and/or other scanning zones behind the vehicle. Consequently, the assistance system may generate false positives due to the detection of the trailer as a hazard and/or fail to detect hazards because of the occlusion from the trailer. This can further complicate the process of towing a trailer, which intrinsically elevates safety concerns alone without consideration to potentially frustrating ADAS or other safety-based systems. Accordingly, towing a trailer may complicate the use of various assistance systems through obscuring sensors used by the systems.

SUMMARY

In one embodiment, example systems and methods associated with adapting the operation of an assistance system according to a presence of a trailer are disclosed. As previously noted, when a vehicle connects to a trailer for purposes of towing, the volume of the trailer may block one or more sensors from perceiving areas behind the vehicle. In general, this may impact activation zones for various assistance systems (e.g., blind spot monitoring) such that the system cannot perceive areas due to the trailer occluding a line of sight of the sensors. Thus, the noted systems may not function or may function with limited ability because of the occluded area that the trailer causes.

Therefore, in one embodiment, a disclosed approach improves the functioning of the assistance system(s) when a vehicle is towing a trailer. For example, in one embodiment, a system may initially detect the presence of the trailer (e.g., when the trailer is connected) and proceed to determine whether the trailer causes an occlusion. In various approaches, the determination about the occlusion may occur actively (e.g., via an analysis of the sensor data in real-time) or passively (e.g., via comparing trailer attributes with known FOVs of sensors). In any case, from information about the occlusion, the system can modify system parameters for how the assistance system behaves while the vehicle is towing the trailer.

The system can adjust areas of activation zones, delivery of alerts, and other parameters that control the operation of the assistance system. For example, the system, in one approach, leverages sensor data from additional sources to maintain the functionality of the assistance system. Thus, the system may simply use sensor data from another sensor that is performing an additional task or activate another sensor on the subject vehicle that is otherwise available. In further aspects, the system may communicate with other sources of information, such as other vehicles, infrastructure-based sensors, and so on. Moreover, the adaptations may also include modifying activation zones (e.g., blind spot zones), modifying timing thresholds, adapting the delivery of alerts, and so on. In this way, the disclosed approach functions to improve the safety of the subject vehicle by adapting the behavior of the assistance system(s) according to the presence of a trailer, thereby avoiding false detections while retaining the general functioning of the assistance systems.

In one embodiment, a trailer system for adapting operation of an assistance system in a subject vehicle according to a presence of a trailer is disclosed. The trailer system includes one or more processors and a memory that is communicably coupled to the one or more processors. The memory stores a detection module including instructions that when executed by the one or more processors cause the one or more processors to, in response to determining that the trailer causes an occlusion to perception of at least one sensor about a surrounding environment of the subject vehicle, modify system parameters associated with the assistance system according to the occlusion to adapt how the assistance system operates while the occlusion is present. The memory stores an assistance module including instructions that when executed by the one or more processors cause the one or more processors to control the assistance system as a function of the system parameters to improve assistance provided to an occupant of the subject vehicle.

In one embodiment, a non-transitory computer-readable medium is disclosed. The computer-readable medium stores instructions that when executed by one or more processors cause the one or more processors to perform the disclosed functions. The instructions include instructions to, in response to determining that the trailer causes an occlusion to perception of at least one sensor about a surrounding environment of the subject vehicle, modify system parameters associated with the assistance system according to the occlusion to adapt how the assistance system operates while the occlusion is present. The instructions include instructions to control the assistance system as a function of the system parameters to improve assistance provided to an occupant of the subject vehicle.

In one embodiment, a method of adapting operation of an assistance system in a subject vehicle according to a presence of a trailer is disclosed. The method includes, in response to determining that the trailer causes an occlusion to perception of at least one sensor about a surrounding environment of the subject vehicle, modifying system parameters associated with the assistance system according to the occlusion to adapt how the assistance system operates while the occlusion is present. The method includes controlling the assistance system as a function of the system parameters to improve assistance provided to an occupant of the subject vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 6 illustrates a table of various behavior modifications for an assistance system.

DETAILED DESCRIPTION

Figure 1:
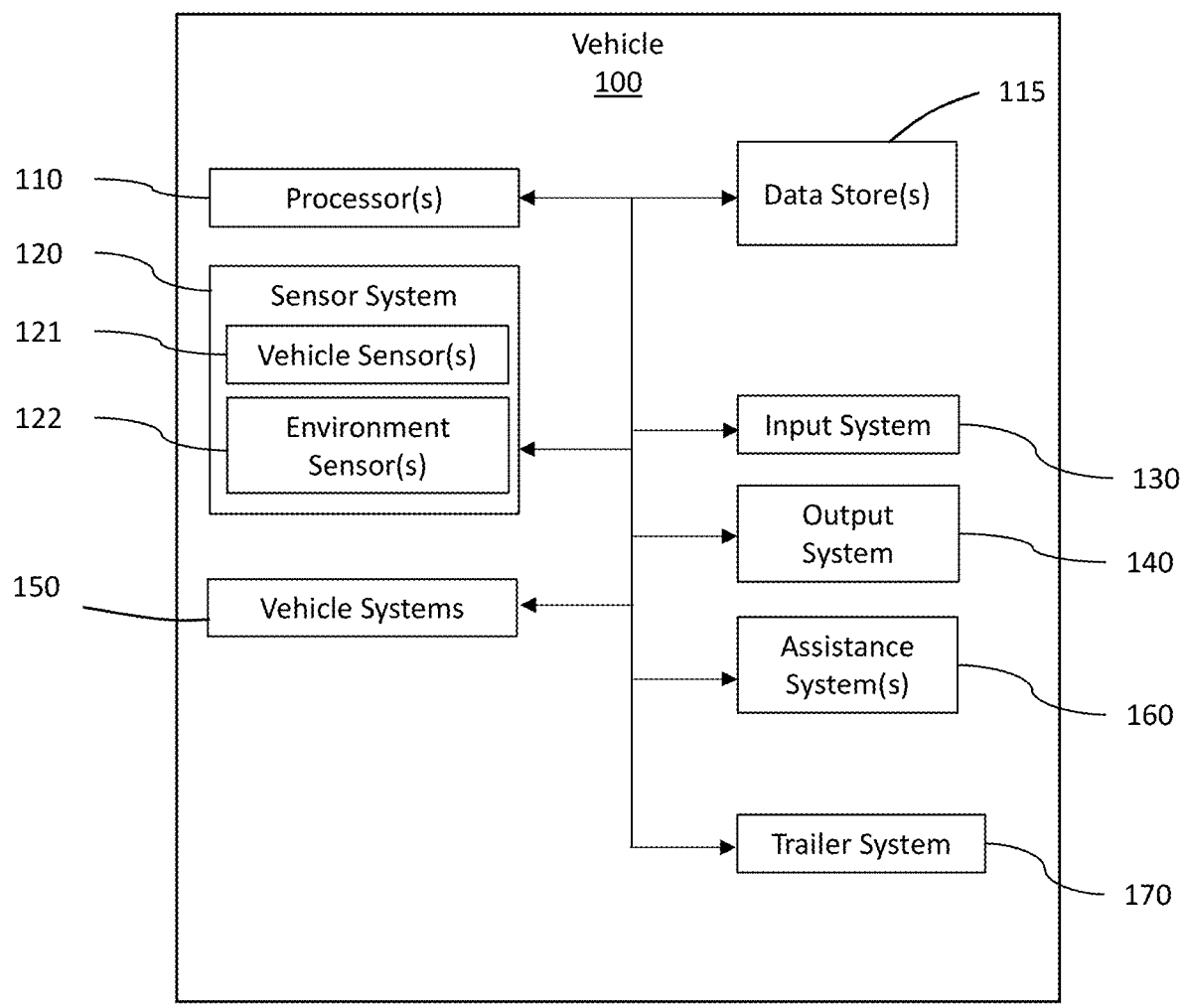
FIG. 1 illustrates one embodiment of a configuration of a vehicle in which example systems and methods disclosed herein may operate.

Systems, methods, and other embodiments associated with adapting the operation of an assistance system according to the presence of a trailer are disclosed. As previously noted, when a vehicle tows a trailer, the trailer may block one or more sensors from perceiving areas behind the vehicle. In general, the occlusion from the trailer may impact various functions of assistance systems (e.g., ADAS) such that the systems may not function or may function with limited abilities.

Therefore, in one embodiment, a trailer system improves the functioning of assistance-related systems when a vehicle is towing a trailer. For example, in one embodiment, a system initially detects the presence of the trailer (e.g., when the trailer is connected) and whether the trailer causes an occlusion to one or more sensors of the subject vehicle associated with the assistance system. The system may then determine whether the trailer causes an occlusion in the field-of-view of at least one sensor associated with the assistance system. In various approaches, the determination about the occlusion may occur actively (e.g., via an analysis of the sensor data in real-time) or passively (e.g., via comparing trailer attributes with known FOVs of sensors). Moreover, the system may periodically recompute the occlusion as the vehicle is traveling and the travel moves position from, for example, turning and other maneuvers.

In any case, from information about the occlusion (i.e., an area that is obscured by the trailer), the system can modify system parameters for how the assistance system behaves while the vehicle is towing the trailer and the occlusion is present. The system can adjust areas of activation zones, delivery of alerts (e.g., adapt alerts per the confidence of sensor data), and other parameters that control the operation of the assistance system. As a preliminary matter, it should be appreciated that the assistance system may include different functions such as blind spot monitoring, lane change assist, rear cross-traffic detection, and so on. Thus, the particular aspects that the system modifies may vary for different types of assistance systems and different occlusions (e.g., flatbed trailer vs. box trailer).

For example, in an instance where a field-of-view for a primary sensor is occluded, the system may adjust the system parameters to leverage sensor data from additional sources that provide for maintaining the functionality of the assistance system (e.g., a sensor having a higher mounting point that avoids the occlusion). Thus, the system may simply use sensor data from another sensor that is performing an additional task or activate another sensor on the subject vehicle that is otherwise available. In further aspects, the system may communicate with other sources, such as other vehicles, infrastructure-based sensors, and so on, to acquire information that supplements sensor data from the occluded sensor. Moreover, the adaptations may also include modifying activation zones (e.g., blind spot zones, safety perimeters, etc.), modifying timing thresholds (e.g., time-to-collision values), adapting the type of alerts/assistance that are delivered, and so on. In this way, the disclosed approach functions to improve the safety of the subject vehicle and occupants therein by adapting the behavior of the assistance system(s) according to the presence of a trailer.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of transport that, for example, tows a trailer, and thus benefits from the functionality discussed herein.

The vehicle 100 also includes various elements. It will be understood that, in various embodiments, the vehicle 100 may not have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. A description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding, analogous, or similar elements. Furthermore, it should be understood that the embodiments described herein may be practiced using various combinations of the described elements.

In either case, the vehicle 100 (also referred to as the subject vehicle herein) includes a trailer system 170 that functions to improve the safety of the vehicle 100 when towing a trailer by adapting the operation of an assistance system to account for the trailer. Moreover, while depicted as a standalone component, in one or more embodiments, the trailer system 170 is integrated with the assistance system 160, or another similar system of the vehicle 100. The assistance system 160 is, in one embodiment, an advanced driving-assistance system (ADAS), or similar system that functions to track nearby objects using sensors that can become occluded when towing a trailer. Moreover, the assistance system 160 may additionally or alternatively include occupant safety systems such as safe exit alert (SEA) systems that provide alerts/warnings to occupants exiting the vehicle 100 about nearby hazards. The noted functions and methods will become more apparent with a further discussion of the figures.

Figure 2:
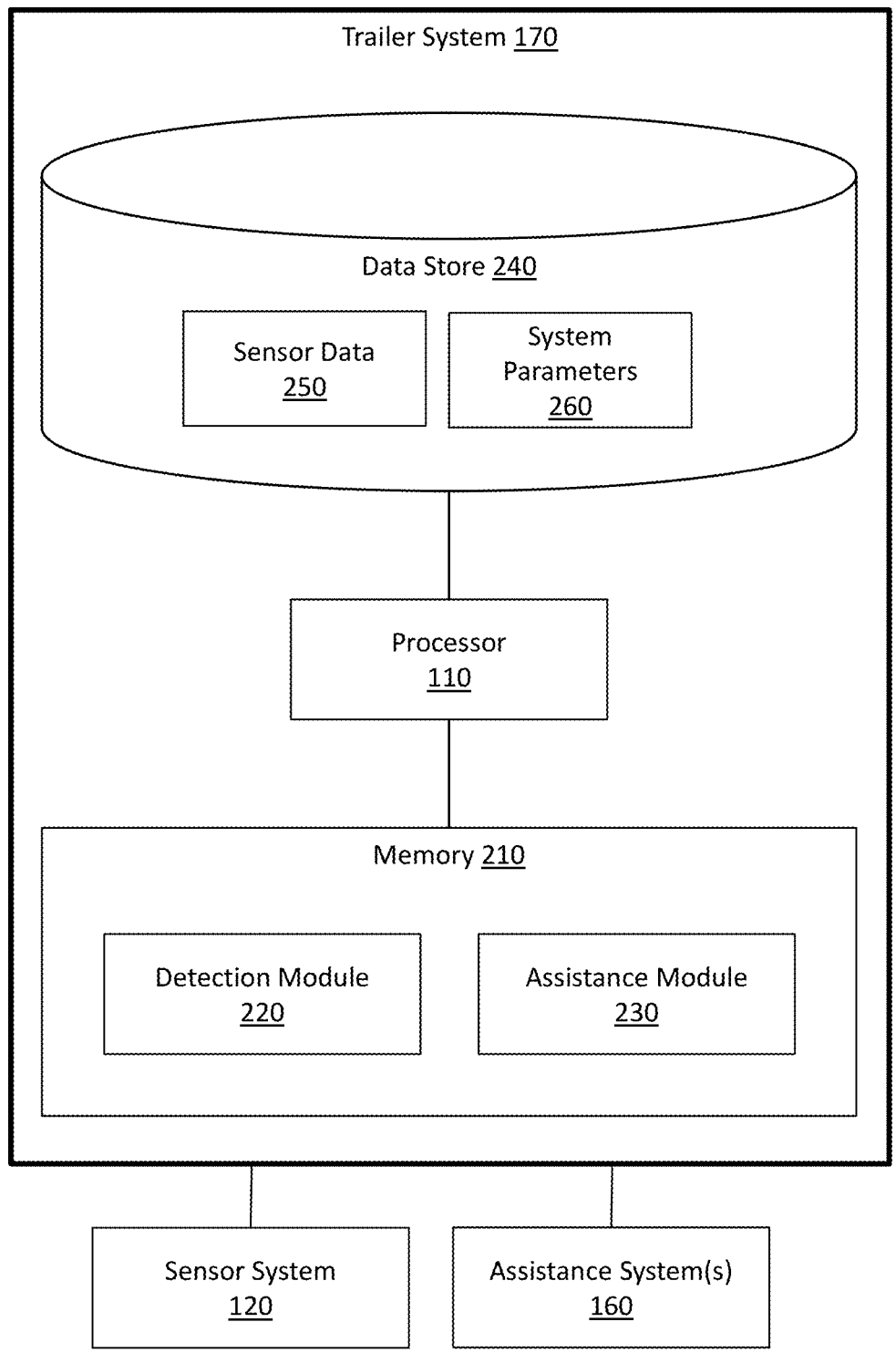
FIG. 2 illustrates one embodiment of a trailer system that is associated with adapting the operation of an assistance system according to the presence of a trailer.

With reference to FIG. 2, one embodiment of the trailer system 170 is further illustrated. As shown, the trailer system 170 includes a processor 110. Accordingly, the processor 110 may be a part of the trailer system 170 or the trailer system 170 may access the processor 110 through a data bus or another communication pathway. In one or more embodiments, the processor 110 is an application-specific integrated circuit that is configured to implement functions associated with a detection module 220 and an assistance module 230. More generally, in one or more aspects, the processor 110 is an electronic processor such as a microprocessor that is capable of performing various functions as described herein when executing encoded functions associated with the trailer system 170.

In one embodiment, the trailer system 170 includes a memory 210 that stores the detection module 220 and the assistance module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that, when executed by the processor 110, cause the processor 110 to perform the various functions disclosed herein. While, in one or more embodiments, the modules 220 and 230 are instructions embodied in the memory 210, in further aspects, the modules 220 and 230 include hardware, such as processing components (e.g., controllers), circuits, etc. for independently performing one or more of the noted functions.

Furthermore, in one embodiment, the trailer system 170 includes a data store 240. The data store 240 is, in one embodiment, an electronically-based data structure for storing information. For example, in one approach, the data store 240 is a database that is stored in the memory 210 or another suitable medium, and that is configured with routines that can be executed by the processor 110 for analyzing stored data, providing stored data, organizing stored data, and so on. In any case, in one embodiment, the data store 240 stores data used by the modules 220 and 230 in executing various functions. In one embodiment, the data store 240 includes sensor data 250, and system parameters 260 (e.g., timing thresholds, activation zones, scanning zones, blind spot models, alert options, etc.) along with, for example, other information that is used by the modules 220 and 230.

Accordingly, the detection module 220 generally includes instructions that function to control the processor 110 to acquire data inputs from one or more sensors (e.g., sensor system 120) of the vehicle 100 that form the sensor data 250. In general, the sensor data 250 includes information that embodies observations of the surrounding environment of the vehicle 100. The observations of the surrounding environment, in various embodiments, can include surrounding lanes, vehicles, objects, obstacles, etc. that may be present in the lanes, proximate to a roadway, within a parking lot, garage structure, driveway, or another area within which the vehicle 100 is traveling or parked.

While the detection module 220 is discussed as controlling the various sensors to provide the sensor data 250, in one or more embodiments, the detection module 220 can employ other techniques to acquire the sensor data 250 that are either active or passive. For example, the detection module 220 may passively sniff the sensor data 250 from a stream of electronic information provided by the various sensors to further components within the vehicle 100. Moreover, the detection module 220 can undertake various approaches to fuse data from multiple sensors when providing the sensor data 250. Thus, the sensor data 250, in one embodiment, represents a combination of perceptions acquired from multiple sensors.

Moreover, in further aspects, the detection module 220 acquires at least a portion of the sensor data 250 from remote sources via wireless communications. For example, the detection module 220 may use vehicle-to-vehicle (V2V), vehicle-to-infrastructure (V2I), or another communication protocol to communicate with other vehicles, infrastructure, etc. and acquire additional information to supplement determinations of the assistance system 160.

In addition to locations of nearby objects (e.g., vehicles, pedestrians, etc.), the sensor data 250 may also include, for example, information about lane markings, velocities of nearby objects/vehicles, and so on. Moreover, the detection module 220, in one embodiment, controls the sensors to acquire the sensor data 250 about an area that encompasses 360 degrees about the vehicle 100 in order to provide a comprehensive assessment of the surrounding environment. Of course, depending on the particular implementation, the subject sensors may have a field-of-view that is focused on a rear area behind the vehicle 100, an area alongside the vehicle 100, or another region that may be impacted by the presence of a trailer.

The sensor data 250 may include varying forms of observations about the surrounding environment that the detection module 220 derives from a single type of sensor (e.g., a radar sensor, a camera, etc.) or that the detection module 220 derives from fusing sensor data from multiple sources (e.g., monocular camera, stereo camera, LiDAR, radar, sonar, etc.). In any case, the sensor data 250 provides observations of the surrounding environment to support the detection, identification, and localization of the nearby objects.

In addition to providing observations of the surrounding environment, the sensor data 250, in at least one approach, further includes information identifying various events associated with the vehicle 100, such as the connection of a trailer with the vehicle 100. The particular sensor that perceives the connection with the trailer may be a purpose-built sensor that detects the physical connection and/or electrical connection of the trailer with the vehicle 100, or may be a general type of sensor, such as a camera or radar that senses the trailer within a field-of-view through an active detection routine or the presence of a large object at close proximity to the vehicle 100. In an alternative approach, the detection module 220 identifies the connection of the trailer and the attributes of the trailer according to a manual electronic input. That is, for example, an operator of the vehicle 100 may electronically enter the attributes of the trailer via an electronic input into, for example, a head unit of the vehicle 100. Thus, the detection module 220 receives the input as a confirmation of the presence of the trailer.

Once the detection module 220 senses the general presence of the trailer, the detection module 220, in one arrangement, undertakes a further analysis of the trailer to determine, for example, attributes of the trailer and whether the trailer causes an occlusion. In one approach, the sensors that the trailer potentially occludes generate sensor data 250, which the detection module 220 analyzes for an occlusion. In one example, the detection module 220 compares a field-of-view of the respective sensors with a volume of the trailer, and may further analyze the noted aspects in relation to activation zones and/or scanning zones to determine an extent to which the trailer occludes the sensor.

By way of example, consider two separate types of trailers in relation to the determination of an occlusion. In one example, the trailer may be a flatbed style trailer that is relatively low to the surface of the roadway, while in a further instance the trailer may be a box style cargo trailer. In the instance of the flatbed trailer, the detection module 220 may determine that a sensor that is mounted midway or higher on a rear section of the vehicle 100 may not be occluded or is only partially occluded by the presence of the trailer. This is because the height of the trailer is low, and, thus, does not infringe into the field-of-view of the sensor in a way that obscures the sensor from perceiving relevant areas in the surroundings. By contrast, a trailer, such as a box trailer, that has a greater height impedes into the FOV of the sensor thereby occluding the sensor from perceiving the same region as before the trailer was present. Accordingly, the occlusion depends on the particular dimensions of the trailer with particular note of the height and width of the trailer.

As such, the detection module 220 can directly compare, for example, images from a camera with prior images and/or activation/scanning zones to determine an extent of the occlusion. The activation/scanning zones are regions about which the sensor data 250 provides perceptions and that the assistance system 160 uses in making various determinations, such as detection of objects, tracking of objects, determining whether the objects satisfy thresholds (i.e., infringe or will infringe into the activation zone), and so on. In further aspects, the detection module 220 may determine if a radar return at, for example, rear corners of the vehicle 100 is frequently detecting side targets indicating the presence of the trailer within the FOV of the radar or determine if the radar is encountering high reflection power indicating the presence of the trailer in front of the sensor. Accordingly, depending on the sensor data 250, the detection module 220 can determine, in one embodiment, an extent of the occlusion caused by the trailer.

Additionally, in one or more arrangements, the detection module 220 uses the sensor to determine the physical attributes of the trailer itself. The detection module 220 may use images, radar returns, or other sensor data to estimate a length, width, and height of the trailer so that the detection module 220 can assess an extent of occlusion to the field-of-view (FOV) for one or more sensors, and, thus, how the trailer may influence operation of the assistance system 160. The detection module 220 uses the attributes to determine an area of the FOV that the trailer occludes. Accordingly, in an instance when the detection module 220 is passively determining the occlusion using the attributes of the trailer (whether received via manual inputs or determined from the sensor data 250 by the detection module 220), the detection module 220 compares a volume of the trailer with known boundaries for the FOVs for respective sensors to identify if and to what extent the trailer occludes the FOV.

From this assessment, the detection module 220 defines, in one embodiment, the occlusion caused by the trailer. The detection module 220 may use the characteristics known about the occlusion in different ways depending on, for example, an extent of the occlusion, the functions being performed by the assistance system 160, and so on. In general, the detection module 220 adjusts the system parameters 260 as a function of the occlusion. As an additional note, it should be appreciated that the determination of the occlusion and the adjustment of the system parameters 260, in at least one approach, occurs iteratively as the vehicle 100 is traveling.

For example, upon initial detection of the trailer (e.g., when the vehicle 100 is turned on when the trailer is physical or attached, or according to another defined event), the detection module 220 performs the assessment of the occlusion and the adjustment to the system parameters 260. Thereafter, the detection module 220, in one embodiment, repeats the determination about the occlusion and then adapts the system parameters 260 according to the updated assessment. The intuition associated with this update process involves the fact that the trailer and the vehicle 100, while attached, move somewhat separately. For example, as the vehicle 100 turns a corner or moves around a curve, the trailer does not remain positioned perfectly behind the vehicle 100 but may swing to either side. As a result of this movement, the occlusion may change in relation to the originally identified occlusion. Thus, the detection module 220 can update the occlusion and also the system parameters 260 to reflect these changes and improve the functioning of the assistance system 160 throughout a trip.

In any case, the detection module 220 modifies the system parameters 260 to account for the occlusion. In one aspect, the detection module 220 modifies activation zones, timing thresholds, types of alerts, sources of the sensor data 250, and/or other aspects of the assistance system 160. In other words, the detection module 220 may resize activation zones to avoid overlap with the trailer and consider the attributes of the trailer (e.g., extended length for lane change assist, blind spot monitoring, etc.), may adapt timing thresholds according to reduced FOVs, may adapt the type of alert to further indicate the presence of the trailer and potential changes in the confidence of determinations, and so on. In this way, the operation of the assistance system 160 is adapted to improve operation according to the presence of the trailer.

Continuing with the assistance module 230, in one approach, the module 230 includes instructions to control the assistance system 160 to perform associated tasks according to the system parameters 260. Thus, the assistance module 230 is, as previously noted, integrated with the assistance system 160 or is at least in communication with the assistance system 160 to control the assistance system 160 to provide alerts and/or other assistance according to the presence of the occlusion. Additionally, in one or more approaches, the assistance system 160 and the trailer system 170 may be integrated together to provide for performing the various functions described herein.

As one example, the assistance system 160, at the direction of the assistance module 230, processes the sensor data 250 to detect nearby objects. The nearby objects can include various types of objects such as vehicular (e.g., automobiles, trucks, motorcycles, etc.), non-vehicular (e.g., pedestrians, animals, bicycles, etc.), and so on. Whichever objects makeup the detected nearby objects, the trailer system 170 generally functions to assist an occupant (i.e., operator or passenger) of the vehicle 100 by improving situational awareness and/or providing assistive control inputs to avoid hazards associated with the nearby object when the occlusion from the trailer is present.

In any case, the assistance module 230, as noted, generally functions to detect a nearby object and determine the characteristics of the object from the sensor data 250. It should be appreciated that, in one or more circumstances, the sensor data 250 may be from one or more sensors that are in addition to sensors that typically provide the sensor data 250 for determinations. For example, in an instance where the detection module 220 determines that the occlusion obstructs an original sensor, the detection module 220 may modify the system parameters 260 to activate an additional sensor on the vehicle 100 to provide at least a portion of the sensor data 250. In one example, the additional sensor may have a higher or wider mounting point on the vehicle 100 that avoids the occlusion or at least part of the occlusion to provide additional information about the activation/scanning zones.

In yet a further example, the detection module 220 may adapt the system parameters 260 to induce the assistance system 160 to acquire at least a portion of the sensor data 250 from a remote device that perceives the relevant regions. In such an instance, the assistance module 230 may establish a connection with the remote device, query the remote device for information, and provide the acquired information to the assistance system 160. As previously noted, the communications may take different forms depending on the circumstances but generally include V2V, V2I, ad-hoc communications, or similar protocols that facilitate the conveyance of information to the assistance system 160.

The sensor data 250 about the nearby object(s) generally includes at least a current position relative to the vehicle 100, and a velocity (i.e., speed and direction). In additional aspects, the assistance module 230 may further determine more complex trajectories that are, for example, extrapolated from multiple prior observations (e.g., over two or more prior time steps). The assistance module 230 generally uses the position and velocity information about the nearby object to predict future positions of the objects from which the assistance module 230 determines whether the nearby object satisfies a threshold (e.g., activation zone and timing threshold). As a brief explanation, the activation zone generally defines a distance to the vehicle 100, perimeter about the vehicle 100, or another relevant zone (e.g., blind spot) related to the vehicle 100 within which an object is considered to be a hazard to the vehicle 100 or occupants of the vehicle 100. Additionally, the timing threshold generally defines a time until the hazard is to be present in the activation zone. For example, the timing threshold may indicate a time-to-collision (TTC) that is a predicted time for the nearby object to enter into the activation zone (e.g., 5.0 seconds).

Thus, the assistance module 230 and/or the assistance system 160 generally includes instructions that function to control the processor 110 to determine whether the nearby object(s) satisfy the noted thresholds for delivering an alert and/or providing assistive controls. As noted, the thresholds may vary according to the particular function of the assistance system 160. For example, a safe exit alert function generally defines different activation zones and timing in comparison to a rear cross-traffic alert function, lane change assist function, or a blind spot monitoring function. Thus, the assistance module 230 generally uses the separate activation zones and/or other thresholds as modified in the system parameters 260 according to the trailer to determine when to activate the noted functions.

The assistance module 230 determines when the nearby object satisfies the activation zone (i.e., predicted trajectory intersects the zone) and/or the timing threshold (e.g., the TTC for the object is <=a defined value) for at least one function of the assistance system 160. In at least one approach, the assistance module 230 may separately assess the thresholds for each separate function. By way of example, in the instance of a safe exit alert functionality, the assistance module 230 determines whether the estimated path of the nearby object intersects with an activation zone, and whether the nearby object is predicted to be within the activation zone within a defined time. When the noted conditions are satisfied, the assistance module 230 indicates that the nearby object satisfies the activation thresholds.

However, instead of delivering the output (e.g., generating an alert, etc.), the modified system parameters 260 cause the assistance system 160 to deliver the alert in a modified form because of the trailer causing the occlusion. For example, instead of preventing a door of the vehicle 100 from opening and also delivering an audible alert, the assistance system 160 may deliver the audible alert according to the modified parameters 260 without restricting the door. The preceding examples are provided for purposes of explanation, and it should be appreciated that the scope of the noted examples should not be construed as limiting, but merely as generally representative of how the trailer system 170 may adapt operation of different systems. Broadly, the assistance system 160 may correspond with one or more of safe exit alert (SEA) functions, blind spot monitoring (BSM) functions, lane change assist (LCA) functions, rear cross-traffic alerts (RCTA), and other assistive systems.

Figure 3:
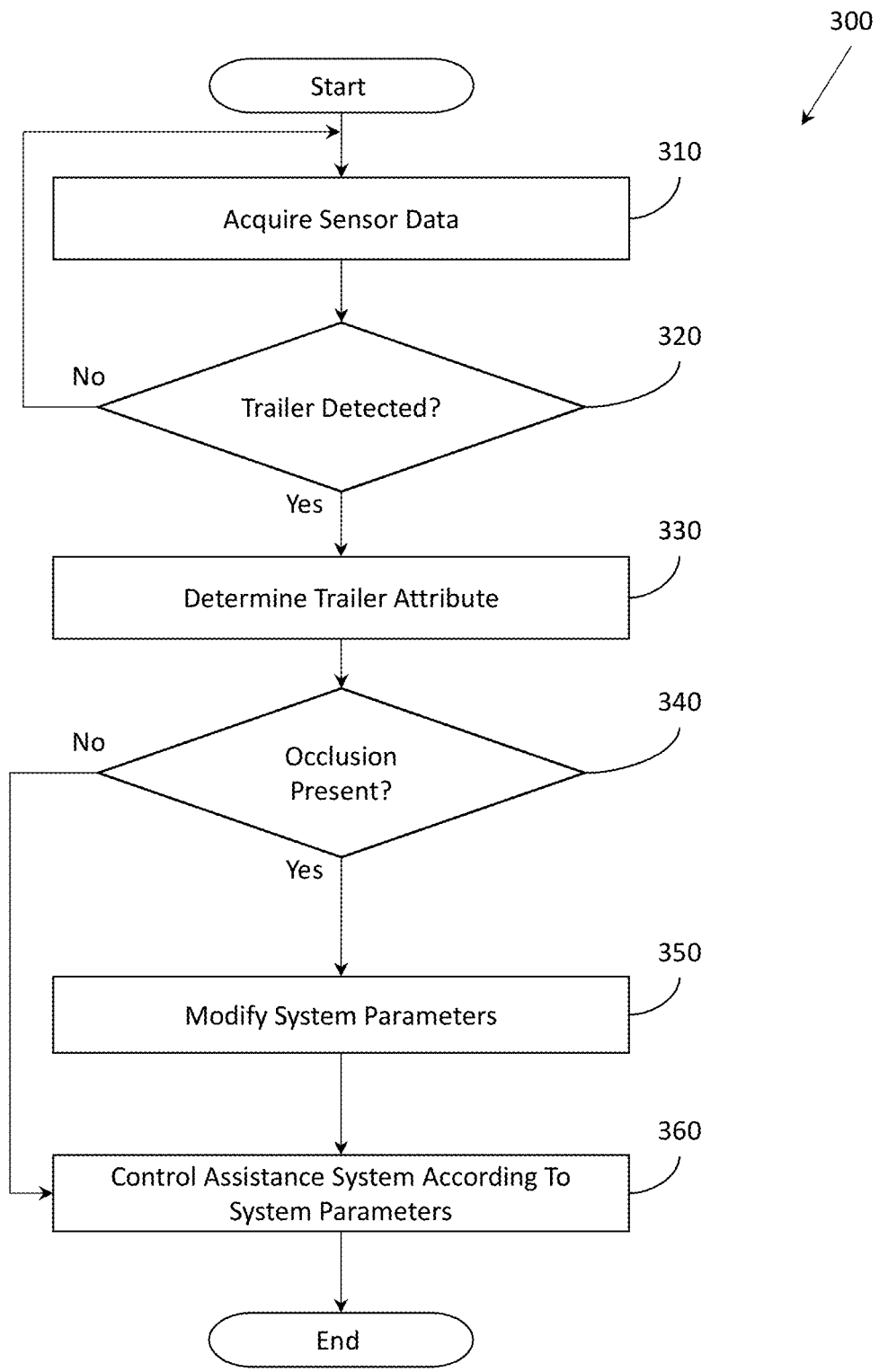
FIG. 3 illustrates one embodiment of a method associated with modifying system parameters of an assistance system according to the presence of a trailer being towed by a subject vehicle.

Additional aspects of modifying operation of an assistance system according to the presence of a trailer will be discussed in relation to FIG. 3. FIG. 3 illustrates a method 300 associated with determining whether a trailer causes an occlusion and adapting system parameters according to the occlusion. Method 300 will be discussed from the perspective of the trailer system 170 of FIG. 1. While method 300 is discussed in combination with the trailer system 170, it should be appreciated that the method 300 is not limited to being implemented within the trailer system 170 but is instead one example of a system that may implement the method 300.

At 310, the detection module 220 acquires sensor data from at least one sensor of the vehicle 100. In one embodiment, the detection module 220 acquires the sensor data 250 about a surrounding environment of the vehicle 100. As previously noted, the detection module 220, in one or more implementations, iteratively acquires the sensor data 250 from one or more sensors of the sensor system 120. The sensor data 250 includes observations of a surrounding environment of the subject vehicle 100, including specific regions that are relevant to functions executed by the assistance system 160 (e.g., activation zones, scanning zones, etc.).

At 320, In one embodiment, the detection module 220 analyzes the sensor data 250 to identify whether the sensor data 250 includes a signature that corresponds with a trailer. The signature may be in the form of a discrete signal associated with a sensor on a ball hitch or other mounting device of the vehicle 100. In one embodiment, the signature is associated with an electrical connection being formed between the vehicle 100 and the trailer (e.g., a connection for powering signaling lights, brakes, etc.). In a further embodiment, the detection module 220 separately undertakes an image recognition process that analyzes images from a camera facing an area of the tow-hitch and the trailer to identify when the trailer is connected with the vehicle 100. In yet a further approach, the presence of the trailer may be manually identified to the vehicle 100 through a human-machine interface (HMI) device that generates electronic input signals when actuated specifying the presence of the trailer.

In any case, the detection module 220 may determine whether the trailer is present according to an active or passive determination. The active determination generally involves an analysis of the sensor data 250 to identify aspects corresponding to the presence of the trailer, such as higher reflectivities in a repeating or a continuous pattern, continuous presence of pixels having a particular character in an image, and so on. In the instance of a passive determination, the detection module 220 may receive an electronic signal from an input device of the vehicle 100 that provides for an operator entering information indicating the presence of the trailer. In any case, upon the detection of the trailer, the detection module 220 proceeds to perform further functions, as discussed at block 330.

At 330, the detection module 220 determines the attributes of the trailer. In one embodiment, the attributes include at least a length and a width of the trailer, but may also include height. In further aspects, the attributes may define a weight and/or further attributes in addition to the overall dimensions. In yet further aspects, the detection module 220 may determine the attributes relative to a FOV of one or more sensors as opposed to determining discrete values for the physical aspects of the trailer. For example, the detection module 220 may determine an extent of the trailer within an FOV of respective sensors effected by the presence of the trailer. By way of example, the detection module 220 may determine how many degrees of the FOV that the trailer obstructs, a height and width of pixels in an image covered by the trailer, and so on. In this way, the detection module 220 may determine attributes relative to the sensor itself without determining actual physical attributes of the trailer. In any case, the detection module 220 uses the attributes to generally assess how the trailer influences a field-of-view for one or more sensors of the vehicle 100 and, in particular, sensors that the assistance system 160 uses to monitor various activation zones.

At 340, the detection module 220 determines whether the trailer is causing an occlusion. In one embodiment, the detection module 220 defines an occlusion as an obstruction within a FOV of a sensor that prevents the sensor from perceiving areas relevant to the operation of the assistance system 160. Thus, while the trailer may partially occlude an FOV in some instances, the detection module 220 may determine that the partial occlusion does not affect the assistance system 160. Such circumstances may include, for example, when the trailer is a flatbed trailer that occludes the road surface, when the trailer occludes a margin, and so on. In one or more approaches, the detection module 220 may define a modification threshold that indicates an extent of the occlusion or particular areas of the FOV (e.g., activation zones, scanning zones or other areas of particular relevance) that are to be obstructed in order to define the trailer as occluding the FOV and modify the system parameters 260.

Accordingly, the detection module 340 may compare the activation zone, the scanning zone, or other portions of the FOV for the sensor with the attributes of the trailer (i.e., areas occluded by the trailer) to determine whether the trailer has any effect on the performance of the sensor in acquiring relevant data. It should be appreciated that the comparison seeks to identify whether the trailer is preventing the particular sensor from perceiving potential hazards and tracking the hazards in order to deliver the respective assistance. Consequently, if the detection module 220 determines that the obstructed area of the FOV satisfies the modification threshold (e.g., covers>a defined percentage, covers specific relevant zones, etc.), then the detection module 220 proceeds to modify the system parameters 260 at 350.

At 350, the detection module 220 modifies the system parameters 260 according to the occlusion of the trailer. The system parameters 260 control operation of the assistance system 160 by defining the various activation zones, timing thresholds, and other aspects associated with how the assistance system 160 functions. That is, the system parameters 260 generally indicate an activation zone/timing threshold for each separate function of the assistance system 160, and may also indicate a type/form of an alert, a manner of intervening with control of the vehicle (e.g., automated steering), and so on. Thus, the detection module 220, in one embodiment, modifies the system parameters 260 according to the occlusion. For example, in one approach, depending on the severity of the occlusion, the detection module 220 may modify the system parameters 260 differently. As one example, if the occlusion is judged to be only partially occluding the FOV, then the detection module 220 may adapt a type of alert to indicate to the occupant a potential reduction in confidence about determinations. By contrast, if the occlusion is more significant, then the detection module 220 may activate further sensors, adjust activation zones, timing thresholds, and/or the alerts in combination. In any case, the system parameters 260 generally define how the assistance system 160 operates and can include a type of alert (e.g., audible, visual, and active restraint), sensors that are sources of the sensor data 250, boundaries for activation/scanning zones, values of timing thresholds, and so on. In this way, the detection module 220 adjusts the system parameters 260 to prevent false-positive detections due to the presence of the trailer.

At 360, the assistance module 230 controls the assistance system 160 according to the system parameters 260. That is, the assistance module 230 controls the operation of the assistance system 160 to acquire the sensor data 250, analyze the sensor data 250, determine whether identified nearby objects satisfy the activation zones and timing thresholds, and to generate a response (e.g., alert) all according to the system parameters 260.

By way of example, the assistance system 160 determines whether the sensor data 250 includes observations of any nearby objects. In one embodiment, the assistance system 160 continuously monitors the observations of the sensor data 250 to determine when a nearby object is present. When detected via an object recognition technique or another approach, the assistance system 160 proceeds with further actions, such as estimating a path of the nearby object. The estimated path forecasts likely future movements/positions of the nearby object in relation to the subject vehicle 100 and the trailer. The assistance system 230 can then determine whether the estimated path satisfies an activation zone/timing threshold. As previously indicated, the detection module 220 may adapt the activation zone according to the presence of the trailer. That is, the detection module 220 may adjust an area of an activation zone or a value of the timing threshold. Thus, if the nearby object is predicted to be in the activation zone according to the estimated path within the defined timing threshold, then the assistance system 160 determines that an action is to be provided. The action may include the noted alerts and/or control of the vehicle 100.

For example, the assistance system 160 may generate output for a detected hazard, such as communicating an alert according to the system parameters 260. In one embodiment, the assistance module 230 activates lights/indicators of the subject vehicle 100 to visibly communicate the alert. In further aspects, the assistance system 160 provides controls to control steering, braking, acceleration, etc. of the vehicle 100. In this way, the trailer system 170 improves the operation of the assistance system 160 when a trailer is connected with the vehicle 100 to facilitate the safety of the vehicle 100 and passengers thereof.

Figure 4:
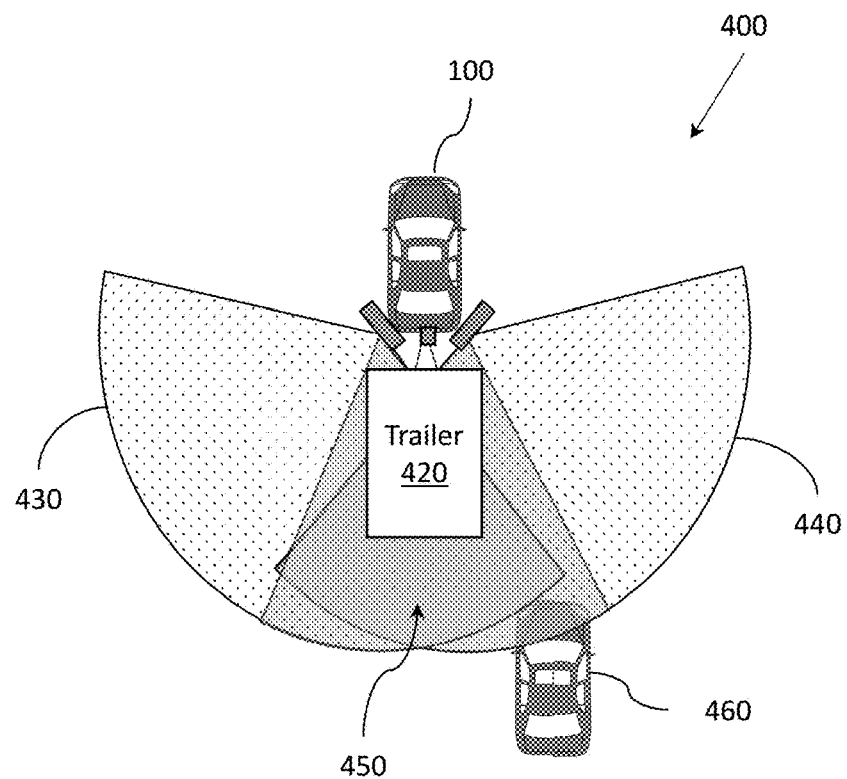
FIG. 4 illustrates one example of how system parameters for a blind spot monitoring system (BSM) may be adapted to leverage additional sensor data when a vehicle is towing a trailer.
Figure 4:
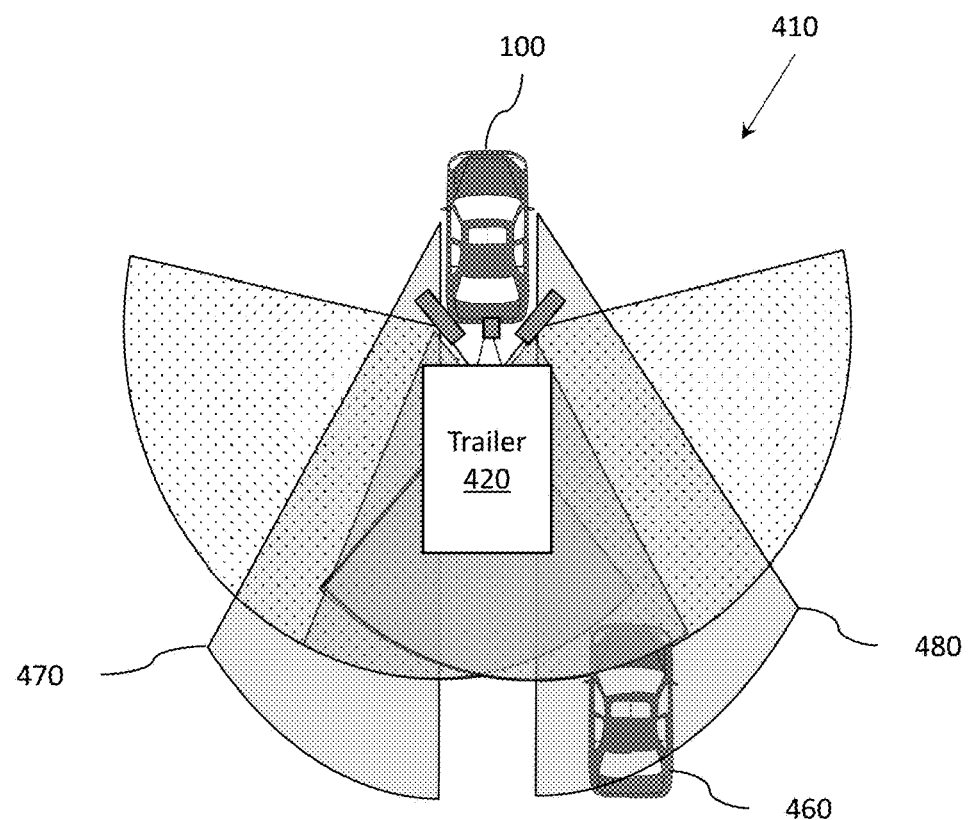
Figure 5:
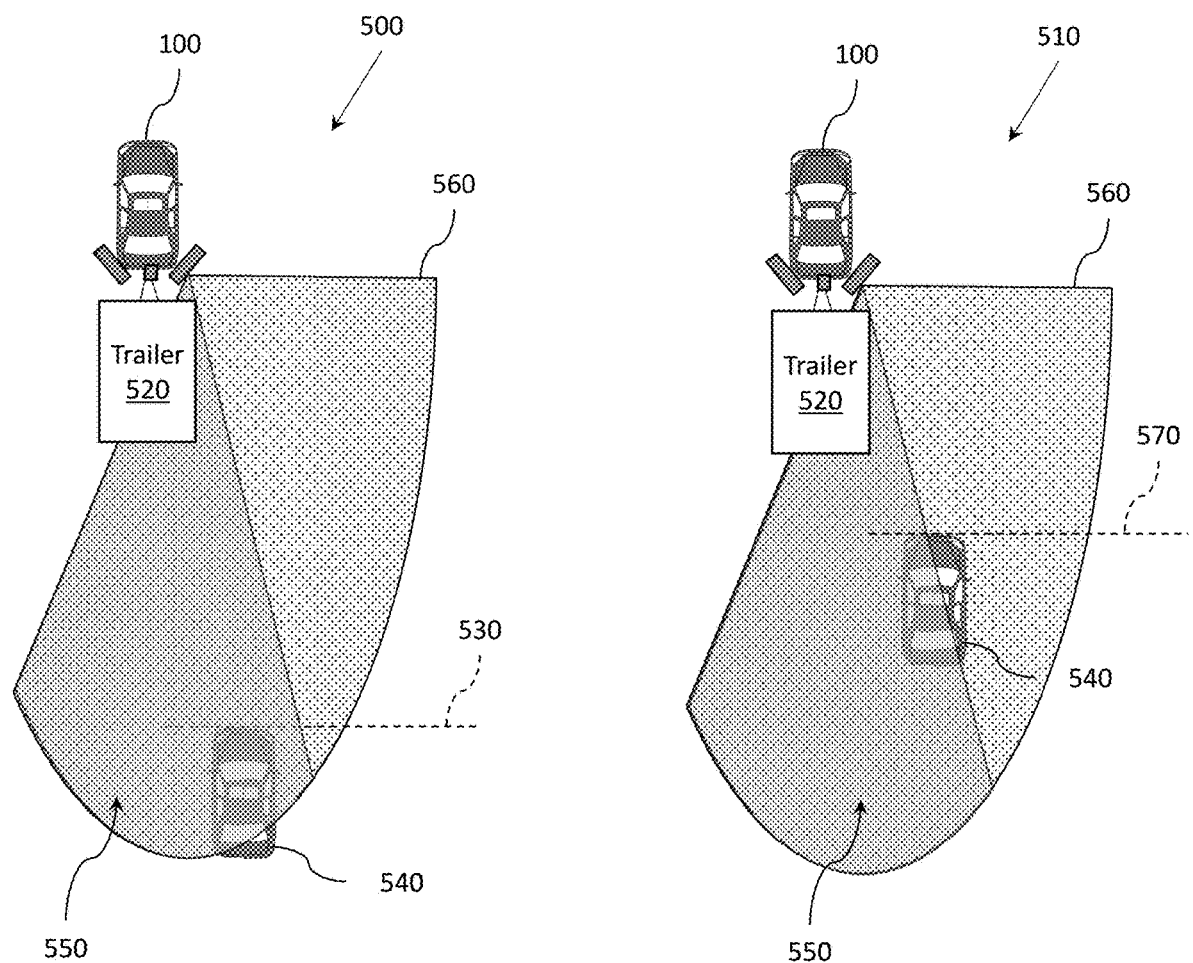
FIG. 5 illustrates one example of how system parameters for a lane change assist (LCA) system may be adapted to adjust a timing threshold.

As a further explanation of how the presently disclosed systems and methods function, consider FIGS. 4-6. FIG. 4 illustrates an example of a blind spot monitoring function of the assistance system 160 at 400 before any modifications to the system parameters 260 and at 410 after the trailer system 170 modifies the system parameters 260 due to the presence of an occlusion. As shown at instance 400, the vehicle 100 is towing a trailer 420. The vehicle 100 further includes sensors positioned with FOVs 430 and 440. The trailer 420 blocks a portion of each FOV 430/440 to generate occlusion 450, as identified by the shaded region. Thus, because the sensors are partially occluded, the assistance system 160 is unaware of approaching vehicle 460 for which the assistance system 160 would otherwise activate a blind spot warning, safe exit alert, or perform another function.

Accordingly, the trailer system 170 resolves the difficulty shown at instance 400 by actively detecting the occlusion and activating additional sensors that provide an improved FOV. As shown at instance 410, the FOVs 470 and 480 from the newly activated sensor resolve at least a portion of the occlusion 450 such that the vehicle 460 is no longer obscured by the occlusion 450 of the trailer 420. Thus, in the example of FIG. 4, the trailer system 170 modifies the system parameters 260 to cause the activation of additional sensors that improve performance and mitigate the occlusion 450 of the trailer 420.

FIG. 5 illustrates an additional example of how the trailer system 170 may modify the system parameters 260 to improve the operation of the assistance system 160 when a trailer is present. As shown in FIG. 5, two separate instances 500 and 510 are illustrated of the vehicle 100 towing a trailer 520. At instance 500, the trailer system 170 has not yet modified the system parameters 260, which indicate at least a timing threshold 530 that may be defined according to a TTC value corresponding with the illustrated line for a current trajectory of the vehicle 540. Thus, once the trailer system 170 identifies the presence of the trailer 520 and that the trailer 520 causes an occlusion 550 within an FOV 560 of a radar sensor of the vehicle 100, the trailer system 170 can modify the timing threshold, as shown in instance 510, to a more reliable value. Thus, adjusting the timing threshold from 530 to 570 (e.g., 5 seconds to 3 seconds) can avoid false negatives for unreliable sensor data associated with the occlusion 550 and instead use more reliable determinations associated with the modified timing threshold even if the duration of the alert is abbreviated.

FIG. 6 illustrates a table 600 that specifies standard/normal behaviors for different functions of the assistance system 160 and special/modified behaviors for when the vehicle 100 is towing a trailer that causes an occlusion. As shown in table 600, the functions include safe exit alert (SEA), lane change assist (LCA), and blind spot monitoring (BSM). The SEA function is shown with multiple different behavior modifications including adapting a type of the alert that is provided to an occupant as well as modifying the timing threshold. Similarly, the lane change assist function may also adapt the timing threshold. Alternatively, the blind spot monitoring function is shown as adapting the sensors that provide sensor data 250 to the assistance system 160. The examples listed in table 600 are provided for purposes of explanation and should not be construed as a limiting set of possibilities. For example, in further aspects, the trailer system 170 may adapt activation zones, control inputs provided to assist an operator, and so on. In this way, the trailer system 170 provides for improved operation of the assistance system 160 when the vehicle 100 is towing a trailer that causes an occlusion.

Additionally, it should be appreciated that the trailer system 170 from FIG. 1 can be configured in various arrangements with separate integrated circuits and/or electronic chips. In such embodiments, the detection module 220 is embodied as a separate integrated circuit. Additionally, the assistance module 230 is embodied on an individual integrated circuit. The circuits are connected via connection paths to provide for communicating signals between the separate circuits. Of course, while separate integrated circuits are discussed, in various embodiments, the circuits may be integrated into a common integrated circuit and/or integrated circuit board. Additionally, the integrated circuits may be combined into fewer integrated circuits or divided into more integrated circuits. In another embodiment, the modules 220 and 230 may be combined into a separate application-specific integrated circuit. In further embodiments, portions of the functionality associated with the modules 220 and 230 may be embodied as firmware executable by a processor and stored in a non-transitory memory. In still further embodiments, the modules 220 and 230 are integrated as hardware components of the processor 110.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

While for purposes of simplicity of explanation, the illustrated methodologies in the figures are shown and described as a series of blocks, it is to be appreciated that the methodologies (e.g., method 300 of FIG. 3) are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is fully automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the trailer system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 240) for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data. The map data can include maps of one or more geographic areas. In some instances, the map data can include information (e.g., metadata, labels, etc.) on roads, traffic control devices, road markings, structures, features, and/or landmarks in the one or more geographic areas. In some instances, the map data can include aerial/satellite views. In some instances, the map data can include ground views of an area, including 360-degree ground views. The map data can include measurements, dimensions, distances, and/or information for one or more items included in the map data and/or relative to other items included in the map data. The map data can include a digital map with information about road geometry. The map data can further include feature-based map data such as information about relative locations of buildings, curbs, poles, etc. In one or more arrangements, the map data can include one or more terrain maps. In one or more arrangements, the map data can include one or more static obstacle maps. The static obstacle map(s) can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level.

The one or more data stores 115 can include sensor data (e.g., sensor data 250). In this context, "sensor data" means any information from the sensors that the vehicle 100 is equipped with, including the capabilities and other information about such sensors.

As noted above, the vehicle 100 can include the sensor system 120. The sensor system 120 can include one or more sensors. "Sensor" means any device, component and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100. Moreover, the vehicle sensor system 121 can include sensors throughout a passenger compartment such as pressure/weight sensors in seats, seatbelt sensors, camera(s), and so on.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 can include one or more radar sensors, one or more LIDAR sensors, one or more sonar sensors, and/or one or more cameras. In one or more arrangements, the one or more cameras can be high dynamic range (HDR) cameras or infrared (IR) cameras.

The vehicle 100 can include an input system 130. An "input system" includes, without limitation, devices, components, systems, elements or arrangements or groups thereof that enable information/data to be entered into a machine. The input system 130 can receive an input from a vehicle passenger (e.g., an operator or a passenger). The vehicle 100 can include an output system 140. An "output system" includes any device, component, or arrangement or groups thereof that enable information/data to be presented to a vehicle passenger (e.g., a person, a vehicle passenger, etc.).

The vehicle 100 can include one or more vehicle systems 150. It should be appreciated that the vehicle 100 can include a different combination of systems in different embodiments. In one example, the vehicle 100 can include a propulsion system, a braking system, a steering system, throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system or a geolocation system.

The processor(s) 110, the trailer system 170, and/or the assistance system 160 can be operatively connected to communicate with the various vehicle systems 150 and/or individual components thereof. For example, returning to FIG. 1, the processor(s) 110 and/or the assistance system 160 can be in communication to send and/or receive information from the various vehicle systems 150 to control the movement, speed, maneuvering, heading, direction, etc. of the vehicle 100. The processor(s) 110, the trailer system 170, and/or the assistance system 160 may control some or all of these vehicle systems 150 and, thus, may be partially or fully autonomous.

The processor(s) 110, the trailer system 170, and/or the assistance system 160 can be operatively connected to communicate with the various vehicle systems 150 and/or individual components thereof. For example, returning to FIG. 1, the processor(s) 110, the trailer system 170, and/or the assistance system 160 can be in communication to send and/or receive information from the various vehicle systems 150 to control the movement, speed, maneuvering, heading, direction, etc. of the vehicle 100. The processor(s) 110, the trailer system 170, and/or the assistance system 160 may control some or all of these vehicle systems 150.

The processor(s) 110, the trailer system 170, and/or the assistance system 160 may be operable to control the navigation and/or maneuvering of the vehicle 100 by controlling one or more of the vehicle systems 150 and/or components thereof. For instance, when operating in an autonomous mode, the processor(s) 110, the trailer system 170, and/or the assistance system 160 can control the direction and/or speed of the vehicle 100. The processor(s) 110, the trailer system 170, and/or the assistance system 160 can cause the vehicle 100 to accelerate (e.g., by increasing the supply of energy provided to the engine), decelerate (e.g., by decreasing the supply of energy to the engine and/or by applying brakes) and/or change direction (e.g., by turning the front two wheels).

Moreover, the trailer system 170 and/or the assistance system 160 can function to perform various driving-related tasks. The vehicle 100 can include one or more actuators. The actuators can be any element or combination of elements operable to modify, adjust and/or alter one or more of the vehicle systems or components thereof to responsive to receiving signals or other inputs from the processor(s) 110 and/or the assistance system 160. Any suitable actuator can be used. For instance, the one or more actuators can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more assistance systems 160. The assistance system 160 can be configured to receive data from the sensor system 120 and/or any other type of system capable of capturing information relating to the vehicle 100 and/or the external environment of the vehicle 100. In one or more arrangements, the assistance system 160 can use such data to generate one or more driving scene models. The assistance system 160 can determine the position and velocity of the vehicle 100. The assistance system 160 can determine the location of obstacles, or other environmental features, including traffic signs, trees, shrubs, neighboring vehicles, pedestrians, and so on.

The assistance system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The assistance system 160 either independently or in combination with the trailer system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The assistance system 160 can be configured to implement determined driving maneuvers. The assistance system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The assistance system 160 can be configured to execute various vehicle functions and/or to transmit data to, receive data from, interact with, and/or control the vehicle 100 or one or more systems thereof (e.g., one or more of vehicle systems 150).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A trailer system for adapting operation of an assistance system in a subject vehicle according to a presence of a trailer, comprising:
   one or more processors;
   a memory communicably coupled to the one or more processors and storing:
   a detection module including instructions that when executed by the one or more processors cause the one or more processors to, in response to determining that the trailer causes an occlusion to perception of at least one sensor about a surrounding environment of the subject vehicle, modify system parameters associated with the assistance system according to the occlusion to adapt how the assistance system operates while the occlusion is present; and
   an assistance module including instructions that when executed by the one or more processors cause the one or more processors to control the assistance system as a function of the system parameters to improve assistance provided to an occupant of the subject vehicle.

2. The trailer system of claim 1, wherein the detection module includes instructions to determine that the trailer causes the occlusion including instructions to analyze sensor data from the at least one sensor to identify whether the trailer blocks at least a portion of a field-of-view (FOV) of one or more of: a rearview camera, and a radar, and
   wherein the detection module includes instructions to analyze the sensor data including instructions to compare the occlusion of the FOV with an activation zone of the assistance system and scanning zones beyond the activation zone to determine whether the occlusion prevents the at least one sensor from perceiving oncoming hazards.

3. The trailer system of claim 1, wherein the detection module includes instructions to determine that the trailer causes the occlusion including instructions to determine attributes of the trailer that define at least dimensions of the trailer including a height and a width, and compare the dimensions with threshold values for occluding a field-of-view of the at least one sensor to identify whether the trailer blocks the at least one sensor from perceiving hazards relative to the subject vehicle.

4. The trailer system of claim 1, wherein the detection module includes instructions to modify the system parameters associated with the assistance system including instructions to activate an additional sensor to gather supplemental information that provides observations of an area associated with the occlusion of the at least one sensor, and
   wherein the occlusion prevents the at least one sensor from perceiving scanning zones in the surrounding environment.

5. The trailer system of claim 1, wherein the detection module includes instructions to modify the system parameters including instructions to perform one or more of change a type of an alert, change a timing threshold for providing the alert, and change an activation zone for providing the alert, and
   wherein the type of the alert includes audible, visual, and active restraint.

6. The trailer system of claim 1, wherein the assistance module includes instructions to control the assistance system as a function of the system parameters including instructions to acquire sensor data according to the system parameters, identify a nearby object from the sensor data, and activate an alert according to the system parameters.

7. The trailer system of claim 6, wherein the sensor data is sensor data from one or more of: the at least one sensor, an additional sensor of the subject vehicle, and a nearby device that is communicating with the subject vehicle.

8. The trailer system of claim 1, wherein the detection module includes instructions to detect that the trailer causes the occlusion including instructions to iteratively determine whether the trailer causes the occlusion and whether movement of the trailer relative to the subject vehicle changes the occlusion, and
   wherein the assistance system includes one or more functions for: lane change assist, rear cross-traffic detection, safe exit alerts, and blind spot monitoring.

9. A non-transitory computer-readable medium storing instructions for adapting operation of an assistance system in a subject vehicle according to a presence of a trailer and that when executed by one or more processors, cause the one or more processors to:
   in response to determining that the trailer causes an occlusion to perception of at least one sensor about a surrounding environment of the subject vehicle, modify system parameters associated with the assistance system according to the occlusion to adapt how the assistance system operates while the occlusion is present; and
   control the assistance system as a function of the system parameters to improve assistance provided to an occupant of the subject vehicle.

10. The non-transitory computer-readable medium of claim 9, wherein the instructions to determine that the trailer causes the occlusion include instructions to analyze sensor data from the at least one sensor to identify whether the trailer blocks at least a portion of a field-of-view (FOV) of one or more of: a rearview camera, and a radar, and
   wherein the instructions to analyze the sensor data include instructions to compare the occlusion of the FOV with an activation zone of the assistance system and scanning zones beyond the activation zone to determine whether the occlusion prevents the at least one sensor from perceiving oncoming hazards.

11. The non-transitory computer-readable medium of claim 9, wherein the instructions to determine that the trailer causes the occlusion include instructions to determine attributes of the trailer that define at least dimensions of the trailer including a height and a width, and compare the dimensions with threshold values for occluding a field-of-view of the at least one sensor to identify whether the trailer blocks the at least one sensor from perceiving hazards relative to the subject vehicle.

12. A method of adapting operation of an assistance system in a subject vehicle according to a presence of a trailer, comprising:
   in response to determining that the trailer causes an occlusion to perception of at least one sensor about a surrounding environment of the subject vehicle, modifying system parameters associated with the assistance system according to the occlusion to adapt how the assistance system operates while the occlusion is present; and
   controlling the assistance system as a function of the system parameters to improve assistance provided to an occupant of the subject vehicle.

13. The method of claim 12, wherein determining that the trailer causes the occlusion includes analyzing sensor data from the at least one sensor to identify whether the trailer blocks at least a portion of a field-of-view (FOV) of one or more of: a rearview camera, and a radar, and
   wherein analyzing the sensor data includes comparing the occlusion of the FOV with an activation zone of the assistance system and scanning zones beyond the activation zone to determine whether the occlusion prevents the at least one sensor from perceiving oncoming hazards.

14. The method of claim 12, wherein determining that the trailer causes the occlusion includes determining attributes of the trailer that define at least dimensions of the trailer including a height and a width, and comparing the dimensions with threshold values for occluding a field-of-view of the at least one sensor to identify whether the trailer blocks the at least one sensor from perceiving hazards relative to the subject vehicle.

15. The method of claim 12, wherein modifying the system parameters associated with the assistance system includes activating an additional sensor to gather supplemental information that provides observations of an area associated with the occlusion of the at least one sensor, and
   wherein the occlusion prevents the at least one sensor from perceiving scanning zones in the surrounding environment.

16. The method of claim 12, wherein modifying the system parameters includes one or more of changing a type of an alert, changing a timing threshold for providing the alert, and changing an activation zone for providing the alert, and
   wherein the type of the alert includes audible, visual, and active restraint.

17. The method of claim 12, wherein controlling the assistance system as a function of the system parameters includes acquiring sensor data according to the system parameters, identifying a nearby object from the sensor data, and activating an alert according to the system parameters.

18. The method of claim 17, wherein the sensor data is sensor data from one or more of: the at least one sensor, an additional sensor of the subject vehicle, and a nearby device that is communicating with the subject vehicle.

19. The method of claim 12, wherein detecting that the trailer causes the occlusion includes iteratively determining whether the trailer causes the occlusion and whether movement of the trailer relative to the subject vehicle changes the occlusion.

20. The method of claim 12, wherein the assistance system includes one or more functions for: lane change assist, rear cross-traffic detection, safe exit alerts, and blind spot monitoring, and
   wherein controlling the assistance system includes one or more of: providing control inputs to control the subject vehicle, and generating an alert to inform one or more occupants of the subject vehicle about a hazard associated with a nearby object, and
   wherein controlling the assistance system includes determining whether an estimated path of the nearby object intersects an activation zone proximate to the subject vehicle defined by the system parameters.

* * * * *